Aug. 28, 1962 P. MALLERY 3,051,941
ANALOG-DIGITAL CONVERTER AND REGISTER
Filed Oct. 24, 1958
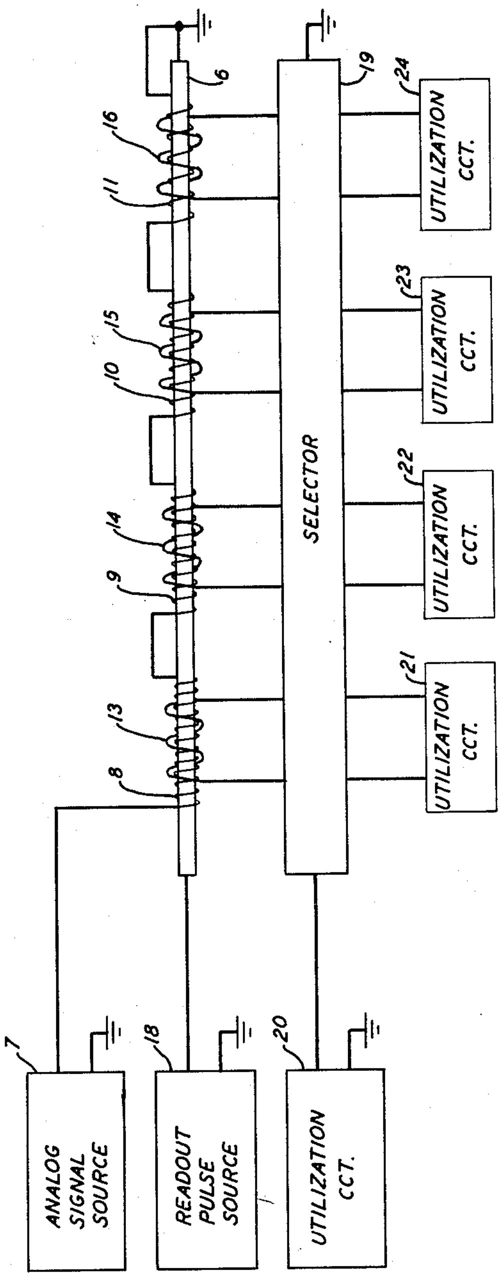
INVENTOR
P. MALLERY
BY Kenneth B. Hamlin
ATTORNEY United States Patent Office 3,051,941

Patented Aug. 28, 1962

3,051,941

ANALOG-DIGITAL CONVERTER AND REGISTER

Paul Mallery, Murray Hill, N.J., assignor to Bell Telephone Laboratories, Incorporated, New York, N.Y., a corporation of New York Filed Oct. 24, 1958, Ser. No. 769,498
10 Claims. (Cl. 340—347)

This invention relates to information input-output devices and more particularly to devices for registering and converting signals bearing information in one form to signals bearing the same information in different form, such as, for example, analog to digital converters.

In analog to digital conversion, a continuous variable function is sampled in discrete ranges or levels and the existence of the variable function in a particular range or level is represented in a notational form by a grouping of signals arranged in time or space sequence. For example, an analog signal whose amplitude varies with time is typically sampled during one or more predetermined time intervals and the signal amplitude measured during each interval is represented by a distinctive number or order of approximately constant amplitude binary signal pulses. While there exist numerous satisfactory timing methods for determining the precise instant or interval during which an amplitude sample is to be taken, the prior art methods for the conversion of a signal amplitude to a digital representation thereof leave room for some considerable simplification with consequent improvements in cost, reliability and space factors. The process of analog to digital conversion in modern high-speed, information-handling apparatus necessarily involves the measurement or grading of a varying analog quantity and it is essential to the successful operation thereof that the task of grading be rapidly and accurately accomplished during the assigned sampling interval. Since accurate grading necessarily involves comparison with a sufficient number of different magnitude standards it is essential that the various standards required be readily reproducible and economically available.

Accordingly, it is an object of the present invention to provide an efficient quantizing register for information signals.

It is another object of the present invention to provide a simple and inexpensive analog to digital signal converter.

It is still another object of this invention to provide an improved analog to digital converter capable of either serial or parallel readout.

Rectangular hysteresis loop magnetic materials are appropriately designated "two-state" because of their inherent quality of undergoing an abrupt change from one to the other of their two remanent magnetization states when a magnetizing force in excess of their switching threshold is applied. Because the remanent magnetic states persist substantially unchanged after the termination of the applied switching force and also because the application of a switching force equalling or exceeding the switching threshold always results in the same amount of magnetization being switched, such two-state materials have been extensively utilized in magnetic memory devices such as the "Twistor" described in the November 1957 issue of "The Bell System Technical Journal" and disclosed in the copending application of A. H. Bobeck, Serial No. 675,522, filed August 1, 1957. In the above-mentioned article the "Twistor" is defined as a two-state, open flux-path magnetic element within which a preferred helical flux path is established and into which magnetic element binary information may be inserted in the form of a polarized helical magnetization. The binary information is sensed using the magnetic element as a sensing means by detecting the polarity of the voltage produced across the ends of the magnetic element as its magnetization state is changed.

In prior art arrangements, however, these magnetic materials have not been utilized in analog applications because their characteristics of repeatability are associated with only two residual states while the accurate conversion of an analog signal typically requires that more than two of its values be determined.

Briefly, I have discovered a method whereby analog signals may be selectively graded by causing each range of analog signals to establish a distinctive number and arrangement of magnetic spots of one magnetic state in material exhibiting two-state remanent magnetization.

In accordance with the principles of this invention, in one specific illustrative embodiment thereof, a source of analog signals is applied to a plurality of equal-length, gradient-pitch windings coupled to a magnetic conductor, having a preferred helical flux path established therein. When energized by the analog signal, each of the windings applies a distinctive magnetizing force to the portion of the conductor to which it is coupled and establishes a magnetic spot therein when the switching threshold of the two-state magnetic conductor material is equalled or exceeded. A digital representation of the analog signal may be reproduced from the magnetic spots so established by selectively switching the spots and by detecting the pattern of voltages appearing either across the ends of the magnetic conductor or across windings coupled to the predetermined portions of the magnetic conductor, as the spots are switched.

It is a feature of the present invention that an analog signal position a magnetic spot in a magnetic conductor according to the amplitude of analog signal coupled thereto.

It is a feature of this invention that an amplitude-variant analog signal, coupled to a magnetic conductor, be quantized according to the number of magnetic spots determined therein by preselected ranges of the analog signal amplitude.

It is another feature of the present invention that a gradient-pitch winding coupled to an open flux-path magnetic conductor selectively establish therein a pattern of magnetic spots in accordance with the value of signal applied to the winding.

The foregoing and other objects and features of the present invention will be more readily understood from the following description when read with reference to the accompanying drawing, the single FIGURE of which illustrates in simplified schematic form an illustrative embodiment of the present invention.

Referring now to the drawing, there is shown an elongated magnetic conductor 6 advantageously having established therein a preferred helical flux path as disclosed in the above-mentioned copending application Serial No. 675,522. For the purpose of simplicity, analog source 7 is assumed to supply an amplitude-variant analog signal which will be sensed in four amplitude ranges, each range corresponding to a distinct information value. Coupled to conductor 6 and serially connected to signal source 7 are four equal-length windings 8 to 11, each of which is composed of a distinctive number of turns corresponding to the four different ranges of signal amplitude into which the signals supplied by source 7 will be classified. The pitch of winding 8 is of sufficient number of turns per inch so that the lowest range of analog signals from source 7 will provide sufficient magnetizing force to establish a stable magnetic state in the portion of conductor 6 under winding 8. The pitch of winding 9 is made somewhat coarser than that of winding 8 so that the lowest range of analog signals from source 7 when applied to winding 9 will not be sufficient to establish a stable magnetic state in conductor 6 under winding 9 but the pitch of winding 9 is sufficiently fine to establish such a stable state when energized by the next higher, or second range of analog signals supplied by 7. The second range of analog signals from source 7 which establishes a stable magnetic region under winding 9 is, however, more than sufficient to set a stable magnetic condition under winding 8 as well, and so that second range of analog signals establishes two adjacent magnetic spots in conductor 6. Similarly, windings 10 and 11 are progressively of coarser pitch than windings 8 and 9 and, when energized respectively, by the third and fourth higher range analog signals, from source 7, are capable of establishing stable magnetic states in the respective portions of conductor 6 to which they are coupled. Accordingly, the third range signal from source 7 will establish a stable magnetic state under each of windings 8, 9 and 10 while the fourth range signal from source 7 will establish stable magnetic states under all of windings 8 to 11.

While in the drawing, coils 8 to 11 are arranged in consecutive order according to the variation in winding pitch, this consecutive arrangement is required only in that mode of operation to be hereinafter more fully explained, wherein detection of the "most significant digit" is desired. It is to be understood, however, that coils 8 through 11 may be serially connected and arranged in any other sequence in accordance with the requirements of other digital coding schemes. In addition, it should also be noted that while for the sake of clarity the gradient pitch windings 8 through 11 are shown in the drawing as being individualized or articulated, in accordance with the principles of the invention, a single, continuously-gradient winding defining lengths of the same winding pitch as do each of windings 8 through 11 may be used with equally advantageous results.

Readout of the analog signal thus registered as a remanent pattern of magnetic spots in conductor 6 may be controlled so as to produce an analog output or either a serial or a parallel digital output representative of the amplitude of the analog signal previously applied to windings 8 to 11 by source 7.

Serial digital readout may be obtained by connecting readout pulse source 18 to conductor 6 and by sequentially sensing each of the coils 13 to 16 to detect the occurrence of flux switching in the portions of conductor 6 to which coils 13 to 16 are coupled. When a source 18 readout pulse is applied to conductor 6, voltages will be detected in only those of coils 13 to 16 that are coupled to portions of conductor 6 in which magnetic spots were previously established by the operation of source 7. In accordance with this mode of operation, selector 19 functions to connect sequentially each of the coils 13 to 16 to utilization circuit 20. Readout source 18 delivers a single pulse to conductor 6, and during the interval in which the magnetic state of the spots priorly set by coils 8 to 11 is being switched, selector 19 scans through the coils 13 to 16. Advantageously, sensing of coils 13 to 16 may start at coil 16 and continue towards coil 13 until a voltage is detected at one of the coils corresponding to the most significant digital value of the stored analog signal, whereupon further sensing may be dispensed with.

Parallel digital output is obtained by operating readout pulse source 18 as before and by actuating selector 19 to connect simultaneously coils 13 through 16 to utilization circuits 21 through 24, respectively. Equal amplitude voltages will be simultaneously delivered to each of utilization circuits 21 through 24 that are connected to those of coils 13 through 16 under which spots of magnetization are switched.

An analog output signal may be obtained by conductively connecting readout pulse source 18 to conductor 6 as before and by operating selector 19 to connect serially coils 13 to 16 between ground and utilization circuit 20. Each of coils 13 through 16 being of the same length the amplitude of signal appearing across the ends of serially-connected coils 13 to 16 will be directly proportional to the number of positions in conductor 6 defined by windings 8 to 11 at which the magnetic state or spot priorly established by source 7 is switched by a pulse from source 18. The digital output is thus obtained by quantizing the analog information registered in conductor 6.

Selectors for serially or sequentially connecting pairs of input terminals to an output terminal pair and for connecting input terminal pairs simultaneously to corresponding output terminal pairs, as required of selector 19 in accordance with the illustrative embodiment of the invention, are well known in the switching art. Thus selector 19 may comprise, for example, a series of wafer switch elements of the type disclosed in FIGS. 2–12 of "The Design of Switching Circuits" by Keister, Ritchie and Washburn, D. Van Nostrand Company, Inc., 1951, each wafer switch element being positioned so as to contact selectively corresponding input and output terminals. A simple sequence switch such as the rotary switch described at pages 179–183 of the aforementioned publication may be associated with the wafer switch elements to facilitate accomplishment of the sequential operation.

A further mode of readout operation may be effected by merely interchanging utilization circuit 20 with readout pulse source 18 so that source 18 is connected to selector 19 and utilization circuit 20 is connected to conductor 6. In this manner the voltage appearing in conductor 6 between the grounded right-hand end thereof and the left-hand end thereof connected to utilization circuit 20 may be delivered to utilization circuit 20 when coils 13 to 16 are pulsed by source 18 operating through selector 19. As above discussed, selector 19 may be employed advantageously to make either sequential connection to coils 13 to 16 or to connect coils 13 to 16 in series.

It is to be understood that the above-described arrangements are illustrative of the application of the principles of the invention. Numerous other arrangements may be devised by those skilled in the art without departing from the spirit and scope of the invention.

What is claimed is:

1. An analog to digital converter comprising, an elongated magnetic conductor exhibiting a substantially square-loop hysteresis characteristic, said conductor having a preferred helical flux path established therein, a source of amplitude variant signals, means connected to said source and coupled to said conductor for applying a gradient magnetizing force along said conductor, means for applying a readout pulse to said conductor, and means for inductively sensing equal-length portions of said conductor as said readout pulse is applied.

2. An analog to digital converter in accordance with claim 1 wherein said first-mentioned means comprises a gradient pitch winding distributed along said conductor.

3. An analog to digital converter in accordance with claim 2 wherein said second-mentioned means comprises a readout pulse source conductively connected to said conductor.

4. An analog to digital converter in accordance with claim 3 wherein said third-mentioned means comprises a plurality of equal-length windings, equally spaced along said conductor.

5. An analog to digital converter in accordance with claim 1 wherein said first mentioned means comprises a plurality of serially-connected equal length gradient pitch windings distributed along said conductor.

6. An analog to digital converter in accordance with claim 5 wherein each of said equal-length windings is coupled to a corresponding one of said equal-length portions of said conductor.

7. An analog-to-digital converter comprising a longitudinal magnetic conductor exhibiting a substantially square-loop hysteresis characteristic, said conductor having a preferred helical flux path established therein, a winding of gradient pitch distributed along said con-